United States Patent
Kim et al.

(12) 
(10) Patent No.: US 6,195,551 B1
(45) Date of Patent: Feb. 27, 2001

(54) IDLE HANDOFF CONTROLLING METHOD IN CELLULAR COMMUNICATION SYSTEM

(75) Inventors: Kyu-Nam Kim, Seoul; Dong-Woo Kim, Kyunggi-Do, both of (KR)

(73) Assignee: Shinsegi Telecomm, Inc., Seoul (KR)

( * ) Notice: Subject to any disclaimer, the term of this patent is extended or adjusted under 35 U.S.C. 154(b) by 0 days.

(21) Appl. No.: 09/119,632

(22) Filed: Jul. 21, 1998

(30) Foreign Application Priority Data

Jul. 22, 1997 (KR) .................................................. 97-34117

(51) Int. Cl.$^7$ ..................................................... H04Q 7/20
(52) U.S. Cl. .................... 455/436; 455/437; 455/440; 455/442; 370/331; 370/332
(58) Field of Search ................... 455/436, 437, 455/438, 442; 370/331, 332, 333

(56) References Cited

U.S. PATENT DOCUMENTS

| | | |
|---|---|---|
| 5,436,956 | 7/1995 | Shiotsuki et al. . |
| 5,889,768 * | 3/1999 | Storm et al. .......................... 370/320 |
| 5,920,550 * | 7/1999 | Willey .................................. 370/332 |

* cited by examiner

Primary Examiner—Dwayne D. Bost
Assistant Examiner—Temica M. Davis
(74) Attorney, Agent, or Firm—Banner & Witcoff, Ltd.

(57) ABSTRACT

An idle handoff controlling method effectively reduces the number of idle handoff processes in a cellular communication system. In the method, a first pilot channel having the strongest strength transmitted from one of a plurality of base stations as an active base station is searched and a strength of the first pilot channel is measured. A variable threshold value based on the first pilot channel strength is calculated. A paging channel having a neighbor list having a plurality of neighbor base stations is monitored in synchronization with the first pilot channel. A strength of a second pilot signal transmitted from one of the plurality of neighbor base stations is measured. The first pilot channel strength from the second pilot channel strength is subtracted to obtain a strength difference. It is judged whether the strength difference is greater than the variable threshold value. Performance of an idle handoff according to the judgement result is controlled. In the method, by reducing the number of the idle handoff in a cellular communication system, waste of a battery of the mobile station is reduced, arrival rate of the mobile station is increased, and communication efficiency of a reverse control channel becomes higher.

15 Claims, 6 Drawing Sheets

IDLE HANDOFF CONTROLLING METHOD IN CELLULAR COMMUNICATION SYSTEM

BACKGROUND OF THE INVENTION

1. Field of the Invention

The present invention relates to a cellular communication system, more particularly, to a method for controlling an idle handoff in a cellular communication system.

2. Prior Art

In a cellular communication environment, when a mobile station moves from a first cell to a second cell, it is necessary to transfer the mobile station's RF communication link with the first cell to the second cell. This operation is commonly called handoff. An idle handoff occurs when a mobile station such as a vehicle mounted telephone, a portable telephone, or a personal communication system handset has moved from the coverage area of one base station into the coverage area of another base station during the mobile station idle state.

If the mobile station detects a pilot channel signal from another base station, that is sufficiently stronger than that of the current base station, the mobile station determines that an idle handoff should occur. In the mobile station idle state, the mobile station continuously searches for the strongest pilot channel signal on the current code division multiple access (CDMA) frequency assignment whenever it monitors the paging channel. If the mobile station determines that one of the neighbor set or remaining set pilot channel signals is sufficiently stronger than the pilot channel of the active set, the mobile station should perform an idle handoff.

U.S. Pat. No. 5,436,956 (issued to Hirofumi Shiotsuki et al. on Jul. 25, 1995) discloses a method and arrangement for reducing the number of handoff requests in a cellular mobile communications system.

FIG. 1 illustrates a conventional idle handoff controlling method in a cellular communication system. In step S101, when a user powers on a mobile station(not shown), the mobile station searches for a first pilot channel having the strongest strength on a current CDMA frequency assignment transmitted from one of the plurality of base stations as an active base station and measures a strength A of the first pilot channel searched. That is, the radios of received pilot energy per chip, Ec, to total received spectral density(noise and signals), It. That is, A=Ec/It.

In step S102, the mobile station searches for a second pilot channel transmitted from one of the plurality of neighbor base stations (not shown) and measures a strength B of the second pilot channel searched. B=Ec1/It1. In step S103, the mobile station subtracts the first pilot channel strength A with respect to the active base station from the second pilot channel strength B with respect to the neighbor base station which are stored in the memory 206 to obtain a strength difference D. That is, D=B−A.

In step S104, the mobile station judges whether or not the strength difference D is greater than a threshold value $C_{TH}$ between 2dB and 3dB. As the result of the judgement in step S104, when the strength difference D is greater than the threshold value $C_{TH}$, the mobile station starts to search for and monitor a paging channel of the neighbor base station so that the mobile station performs an idle handoff(step S105). Thus, the mobile station can communicate with other mobile stations (not shown) located in a service area of the neighboring base station. When it is judged that the strength difference D is less than or equal to the threshold value $C_{TH}$, the routine returns to step S101 and the above process with respect to other neighbor base stations except the neighbor base station already processed repeats.

In the conventional idle handoff controlling method, the threshold value is a fixed value from 2dB to 3dB. When the second pilot channel transmitted from one of the plurality of base stations is momentarily received stronger than the first pilot channel transmitted from an active base station, even when the strength of the first pilot channel is sufficiently strong, the mobile station should perform the idle handoff.

Accordingly, waste of a battery of the mobile station increases and arrival rate of the mobile station lowers due to frequent idle handoff. When the mobile station moves to another area, the mobile station should periodically provide the information about the position thereof to the base station in order to receive a terminated call from a base station. Thus, a load of a reverse control channel is increased and communication efficiency of a reverse control channel becomes lower. Particularly, when a paging zone is changed, arrival rate of the mobile station lowers due to frequent idle handoff. It is therefore highly desirable to reduce the number of handoffs in order to provide the service of good quality.

SUMMARY OF THE INVENTION

Therefore, it is an object of the present invention, for the purpose of solving the above mentioned problems, to provide an idle handoff controlling method for effectively reducing the number of idle handoff processes in a cellular communication system.

In order to attain the object, according to the present invention, there is provided an idle handoff controlling method in a cellular mobile communication system, said method comprising the steps of:

a) searching a first pilot channel having the strongest strength transmitted from one of a plurality of base stations as an active base station and measuring a strength of the first pilot channel;

b) calculating a variable threshold value based on the first pilot channel strength measured in step a);

c) monitoring a paging channel having a neighbor list of the active base station having a plurality of neighbor base stations in synchronization with the first pilot channel;

d) measuring a strength of a second pilot signal transmitted from one of the plurality of neighbor base stations included on the neighbor list;

e) subtracting the first pilot channel strength from the second pilot channel strength to obtain a strength difference;

f) judging whether the strength difference is greater than the variable threshold value; and g) controlling performance of an idle handoff according to the judgement result of step f).

Also, there is provided an idle handoff controlling method in a cellular communication system, said method comprising the steps of:

i) searching a first pilot channel having the strongest strength transmitted from one of the plurality of base stations as an active base station and measuring a strength of the first pilot channel;

ii) monitoring a paging channel having a neighbor list of the active base station which has a plurality of neighbor base stations in synchronization with the first pilot channel;

iii) measuring a strength of a second pilot signal transmitted from one of the plurality of neighbor base stations in the neighbor list neighboring the active base station;

iv) subtracting the first pilot channel strength from the second pilot channel strength to obtain a strength difference;

v) judging whether the strength difference is greater than a threshold value;

vi) judging whether a state that the strength difference is greater than the threshold value lasts for a predetermined time interval when the strength difference is greater than the threshold; and vii) controlling performance of an idle handoff according to a judgement result of step vi).

Also, there is provided an idle handoff controlling method, said method comprising the steps of:

(A) searching a first pilot channel having the strongest strength transmitted from one of the plurality of base stations as an active base station and measuring a strength of the first pilot channel;

(B) monitoring a paging channel having a neighbor list of the active base station which has a plurality of neighbor base stations in synchronization with the first pilot channel and storing the neighbor list;

(C) measuring a strength of a second pilot signal transmitted from one of the plurality of neighbor base stations in the neighbor list neighboring the active base station;

(D) subtracting the strength of the first pilot signal from the strength of the second pilot signal to obtain a strength difference;

(E) judging whether the strength difference is greater than a threshold value;

(F) judging whether step (E) is performed by a predetermined number; and (G) controlling performance of an idle handoff according to a judgement result of step F).

According to the present invention, by reducing the number of the idle handoff in a cellular communication system, waste of a battery of the mobile station is reduced, arrival rate of the mobile station is increased, and communication efficiency of a reverse control channel becomes higher.

Other objects and further features of the present invention will become apparent from the detailed description when read in conjunction with the attached drawings.

BRIEF DESCRIPTION OF THE DRAWINGS

Other features and advantages of the present invention will become more apparent from the following description taken in connection with the accompanying drawings, wherein.

DETAILED DESCRIPTION OF THE PREFERRED EMBODIMENT

The preferred embodiment of the present invention will hereinafter be described in detail with reference to the accompanying drawings.

Figure 1:
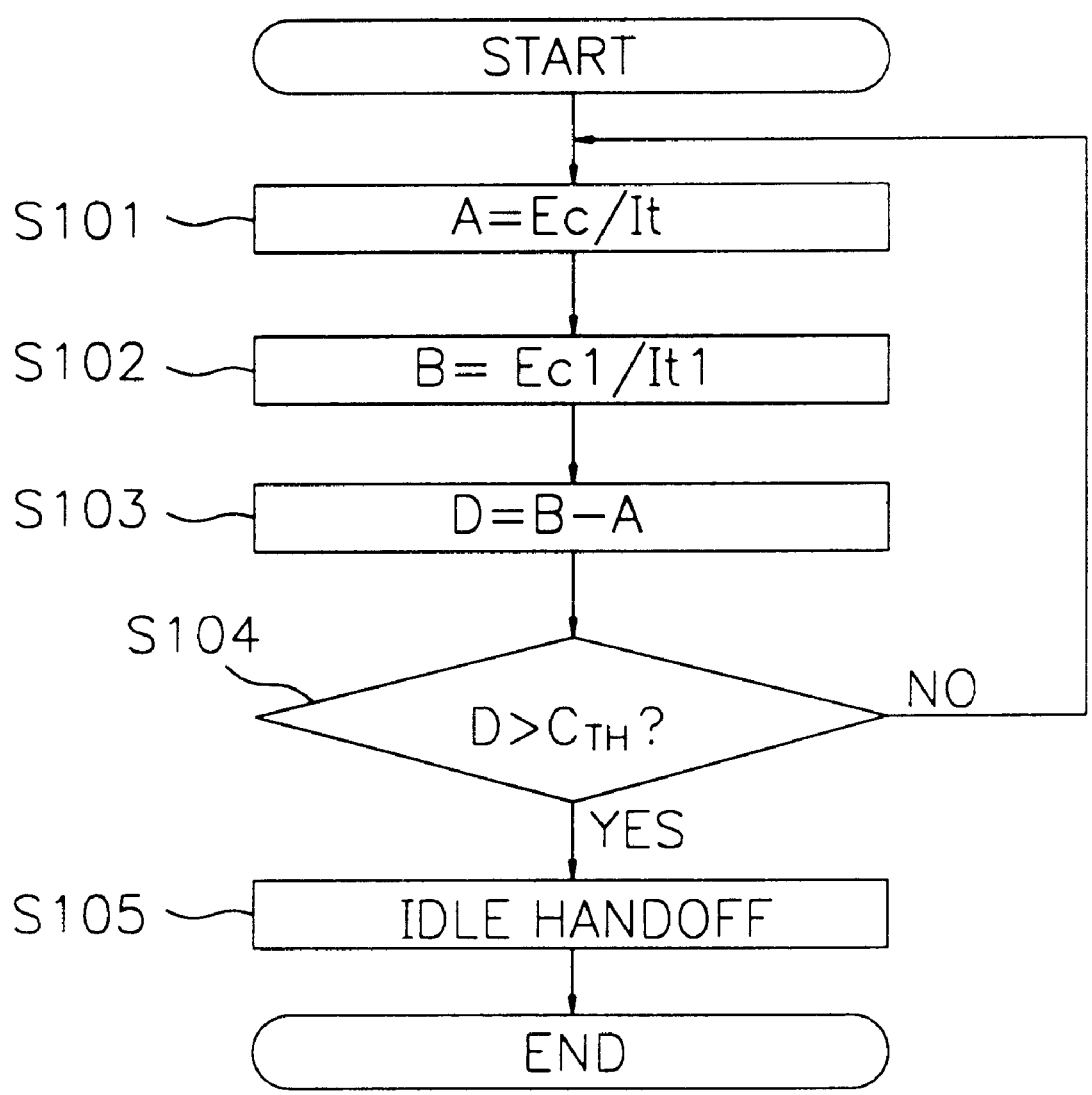
FIG. 1 is a flow chart for illustrating a conventional idle handoff controlling method in a cellular communication system.
Figure 2:
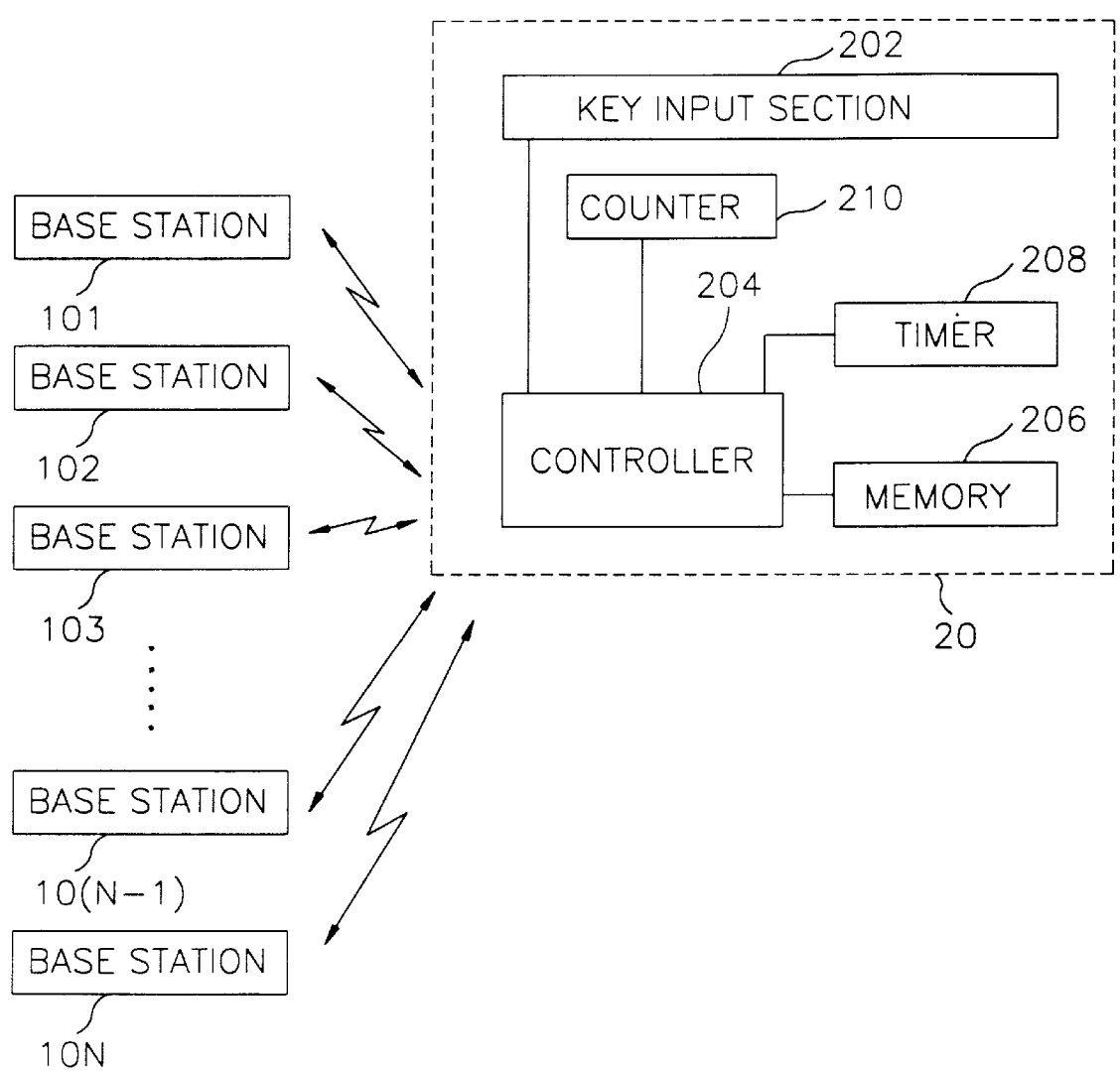
FIG. 2 is a block diagram for showing a configuration of a cellular communication system in order to illustrate an idle handoff controlling method according to the present invention.

FIG. 2 shows a configuration of a cellular communication system in order to illustrate an idle handoff controlling method according to the present invention. The cellular communication system includes a mobile station 20 and a plurality of base stations 101, 102, 103, . . . 10(N−1), and 10N (where, N is an integer). The mobile station 20 includes a key input section 202, a controller 204, a memory 206, a timer 208, and a counter 210. Key input section 202 includes a power button for powering on the mobile station 20.

Controller 204 searches for a pilot channel transmitted from one of the plurality of base stations 101, 102, 103, . . . 10(N−1), and 10N (where, N is an integer) having the strongest strength on a current CDMA frequency assignment as an active base station 101 and measures a strength A(N) (where, N is an integer) of the pilot channel searched. Controller 204 calculates a threshold value $V_{TH}(N)$ based on the strength A(N) of the pilot channel with respect to the active base station 101. Controller 204 searches for a paging channel on which a neighbor list(K) (where K is an integer) of the active base station 101 in synchronization with the pilot channel transmitted from the active base station 101 and stores the neighbor list(K) in memory 206. The paging channel is an encoded, interleaved, spread, and modulated spread spectrum signal that is used by mobile stations operating within the coverage area of the base station. The base station uses the paging channel to transmit system overhead information and mobile station specific messages. Controller 204 searches for a pilot channel transmitted from the N-th neighbor base station and measures a strength K(N) (where N is an integer) of the pilot channel of the N-th neighbor base station. Controller 204 subtracts the strength A(N) of the pilot channel with respect to the active base station 101 from the strength K(N) of the pilot channel with respect to the N-th neighbor base station. Controller 204 judges whether or not the strength difference SD(N) is greater than the threshold value $V_{TH}(N)$ and controls the performance of the idle handoff according to the judgement.

Memory 206 stores the strength A(N) of the pilot channel with respect to the active base station 101 measured by controller 204. Memory 206 stores the threshold value $V_{TH}(N)$. Memory 206 stores a neighbor list(K) (where K is an integer) of the active base station 101 included on the paging channel therein. Memory 206 stores the strength difference SD(N). Timer 208 is reset by pressing a power button of a key input section 202 and counts a time interval TI which the state that the strength difference SD(N) greater than the threshold value $F_{TH}$ lasts when the strength difference SD(N) is greater than the threshold value $F_{TH}$. Counter 210 is reset by pressing a power button of a key input section 202 and counts the executing number of the step of judging whether or not the strength difference SD(N) is greater than the threshold value $G_{TH}(N)$ when the strength difference SD(N) is greater than the threshold value $G_{TH}$.

EMBODIMENT 1

Figure 3:
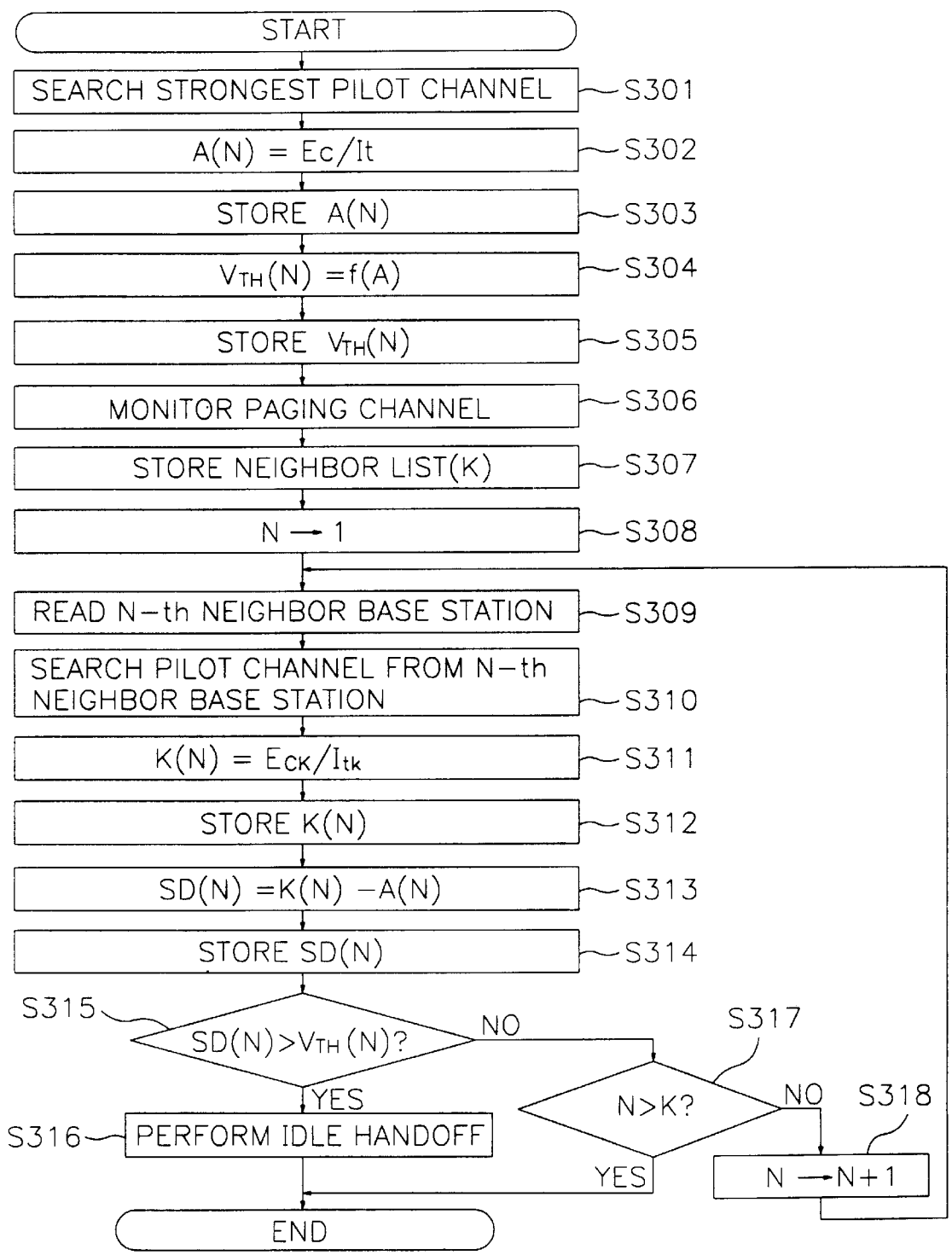
FIG. 3 is a flow chart for illustrating an idle handoff controlling method in a cellular communication system according to the first embodiment of the present invention.

FIG. 3 illustrates an idle handoff controlling method in a cellular communication system according to the first embodiment of the present invention.

In step S301, when a user presses a power button of a key input section 202 of a mobile station 20, a controller 204 of a mobile station 20 monitors a first pilot channel having the strongest strength on a current CDMA frequency assignment transmitted from one of the plurality of base stations 101, 102, 103, . . . 10(N−1), and 10N (where, N is an integer) as an active base station. In step S302, the controller 204 measures a strength A(N) (where, N is an integer) of the first pilot channel searched in step S301, that is, the radios of received pilot energy per chip, Ec, to total received spectral density(noise and signals), It. Then the controller 204 stores the pilot channel strength A(N) with respect to the active base station 101 in the memory 206(step S303).

In step S304, the controller 204 calculates a variable threshold value $V_{TH}(N)$ based on the strength A(N) of the pilot channel with respect to the active base station 101 stored in the memory 206 by means of the following equation.

Threshold value $V_{TH}(N)=f(A)$, where N is an integer

That is, the variable threshold value $V_{TH}(N)$ is a continuous or discrete function of the first pilot channel strength A(N) with respect to the active base station 101 and changes proportional to the first pilot channel strength A(N) with respect to the active base station 101. In an embodiment of the present invention, when the variable threshold value $V_{TH}(N)$ is a continuous function $f(A)=M \times A(N)$ (where, M is an integer) the variable threshold value $V_{TH}(N)$ is increased by M times of the first pilot channel strength A(N) with respect to the active 101 when the first pilot channel strength A(N) is increased. Also, when the variable threshold value $V_{TH}(N)$ is a continuous function $f(A)=M \times A(N)+C$, (where M and C are integers), no matter how small the first pilot channel strength A(N) is, the variable threshold value $V_{TH}(N)$ is greater than the C. On the other hand, when the variable threshold value $V_{TH}(N)$ is a discrete function, since the first pilot channel strength A(N) has a discrete value of A(N)>X1, A(N)>X2, . . . , A(N)>Xn−1, and A(N)>Xn, A(N) has a value of A(N)=f(X1), A(N)=f(X2), . . . , A(N)=f(Xn−1), and A(N)=f(Xn) (where, X1>X2>. . . >Xn−1>Xn and f(X1)>f(X2), . . . , >f(Xn−1)>f(Xn). That is, since the first pilot channel strength A(N) has a discrete value, the variable threshold value $V_{TH}(N)$ discretely changes.

Then the controller 204 stores the threshold value $V_{TH}(N)=f(A)$ in the memory 206 (step S305). In step S306, the controller 204 searches for a paging channel having a neighbor list(K) (where K is an integer) of the active base station which has a plurality of neighbor base stations transmitted from the active base station 101 in synchronization with the pilot channel searched in step S301.

In step S307, the controller 204 controls the memory 206 to store a neighbor list(K) (where K is an integer) of the active base station included on the paging channel therein. Preferably, in an embodiment of the present invention, the active base station 101 includes nineteen neighbor base stations.

In step S308, the controller 204 sets the number of a neighbor base station message to be read to 1 (N→1). In step S309, the controller 204 reads the message corresponding to an N-th neighbor base station stored in the memory.

In step S310, a controller 204 searches for a second pilot channel transmitted from the N-th neighbor base station corresponding to the message read in step 309. In step S311, the controller 204 measures a strength K(N) (where N is an integer) of the pilot channel searched in step S310. Then the controller 204 stores the strength K(N) of the pilot channel with respect to the N-th neighbor base station in the memory 206 (step S312).

In step S313, the controller 204 subtracts the strength A(N) of the pilot channel with respect to the active base station 101 from the strength K(N) of the second pilot channel with respect to the N-th neighbor base station which are stored in the memory 206 to obtain a strength difference SD(N). That is, SD(N)=K(N)−A(N). Then the controller 204 stores the strength difference SD(N) obtained in step S313 in the memory 206 (step S314).

In step S315, the controller 204 judges whether or not the strength difference SD(N) is greater than the threshold value $V_{TH}(N)$. As the result of the judgement in step 315, when the strength difference SD(N) is greater than the threshold value $V_{TH}(N)$, the controller 204 searches for and monitor a paging channel of the N-th neighbor base station so that the mobile station 20 performs an idle handoff (step S316). Thus, the mobile station 20 can communicate with other mobile stations(not shown) located in a service area of the N-th neighboring base station. When it is judged that the strength difference SD(N) is less than or equal to the threshold value $V_{TH}(N)$, the controller 204 judges whether or not the executing number N of step S315, is greater than the total number K of the neighbor base stations(step S317).

Figure 6:
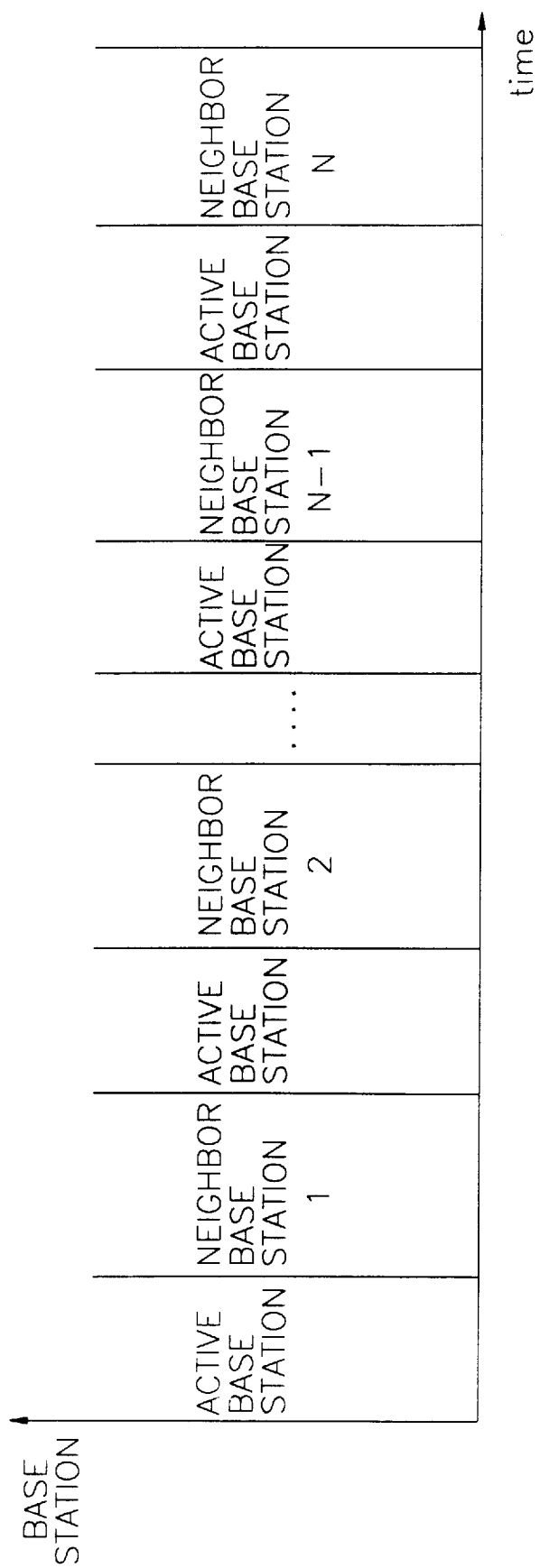
FIG. 6 is a view for showing measuring order of pilot channel strengths by the mobile station in FIG. 2.

As the result of the judgement in step S317, when the executing number N of step S315 is greater than the total number K of the neighbor base stations of the active base station 101, the routine is completed. When it is judged that the number N the judgement of step S315 is smaller than or equal to the total number K of the neighbor base station, the controller 204 searches for a pilot channel presently transmitted from the active base station 101 and increases the number of a neighbor base station message to be processed (step S318). Then the routine returns to step S309 so that the above processes with respect to a neighbor base station 2, a neighbor base station 3, . . . , a neighbor base station N−1, and a neighbor base station N are performed as shown in FIG. 6.

EMBODIMENT 2

Figure 4:
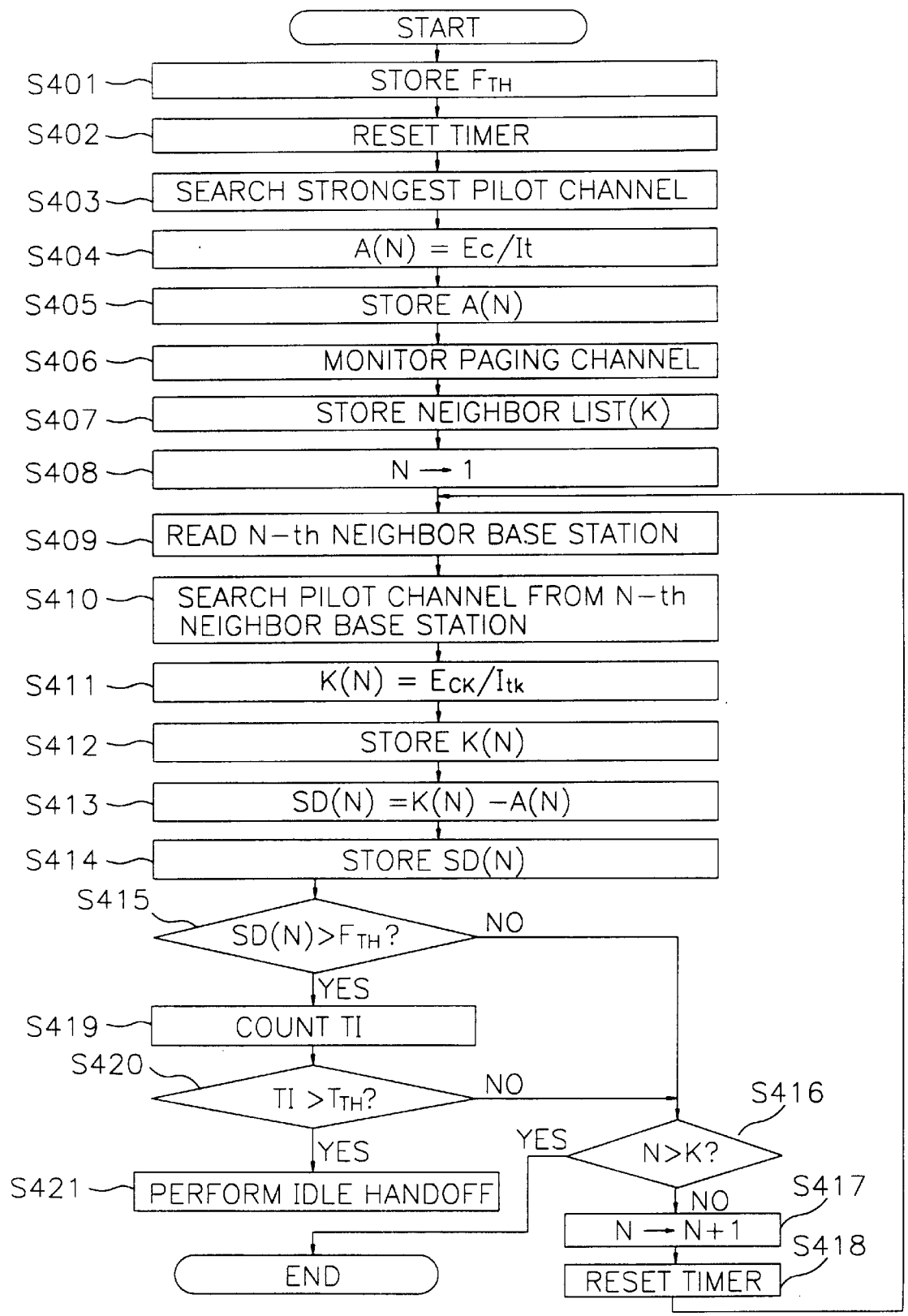
FIG. 4 is a flow chart for illustrating an idle handoff controlling method in a cellular communication system according to the second embodiment of the present invention.

FIG. 4 illustrates an idle handoff controlling method in a cellular communication system according to the second embodiment of the present invention.

In step S401, the controller 204 controls the memory 206 to store a threshold value $F_{TH}$ therein before performing the idle handoff. When a user presses a power button of a key input section 202, a controller 204 controls the timer 208 to be reset(step S402). In step S403, the controller 204 monitors a pilot channel having the strongest strength on a current CDMA frequency assignment transmitted from one of the plurality of base stations 101, 102, 103, . . . 10(N−1), and 10N (where, N is an integer) as an active base station 101. In step S404, the controller 204 measures a strength A(N) (where, N is an integer) of the first pilot channel searched in step S403, that is, the radios of received pilot energy per chip, Ec, to total received spectral density(noise and signals), It. Then the controller 204 stores the pilot channel strength A(N) with respect to the active base station 101 in the memory 206 (step S405).

In step S406, the controller 204 searches for a paging channel having a neighbor list(K) (where K is an integer) of the active base station 101 which has a plurality of neighbor base stations transmitted from the active base station 101 in synchronization with the pilot channel searched in step S403. In step S407, the controller 204 controls the memory 206 to store a neighbor list(K) (where K is an integer) of the active base station 101 included on the paging channel therein.

In step S408, the controller 204 sets the number of a neighbor base station message to be read to 1(N→1). In step S409, the controller 294 reads the message corresponding to an n-th neighbor base station stored in the memory 206.

In step S410, a controller 204 searches for a pilot channel transmitted from the n-th neighbor base station corresponding to the message read in step S409. In step S411, the controller 204 measures a strength K(N) (where N is an integer) of the pilot channel searched in step S410. Then the controller 204 stores the second pilot channel strength K(N) with respect to the N-th neighbor base station in the memory 206 (step S412).

In step S413, the controller 204 subtracts the strength A(N) of the pilot channel with respect to the active base station 101 from the second pilot channel strength K(N) with respect to the N-th neighbor base station which are stored in the memory 206 to obtain a strength difference SD(N). That is, SD(N)=K(N)−A(N). Then the controller 204 stores the strength difference SD(N) obtained in step S413 in the memory 206(step S414).

In step S415, the controller 204 judges whether or not the strength difference SD(N) is greater than the threshold value $F_{TH}$ which is stored in the memory 206. As the result of the judgement in step S415, when the strength difference SD(N) is less than or equal to the threshold value $F_{TH}$, the controller 204 judges whether or not the executing number N of step S415 is greater than the total number K of the neighbor base station(step S416).

As the result of the judgement in step S416, when the executing number N of step S415 is greater than the total number K of the neighbor base stations of the active base station 101, the routine is completed. When it is judged that the executing number N of step S415 is smaller than or equal to the total number K of the neighbor base stations, the controller 204 searches for a pilot channel presently transmitted from the active base station 101 and increases the number of a neighbor base station message to be processed (step S418). Then the controller 204 controls the timer 208 to be reset (step S418) and the routine returns to step S409 so that the above processes with respect to a neighbor base station 2, a neighbor base station 3, . . . , a neighbor base station N−1, and a neighbor base station N are sequentially performed as shown in FIG. 6.

On the other hand, as the result of the judgement in step S415, when the strength difference SD(N) is greater than the threshold value $F_{TH}$, the controller 204 controls the timer 208 to count a time interval TI in which the state that the strength difference SD(N) is greater than the threshold value $F_{TH}$ lasts (step S419).

In step S420, the controller 204 judges whether or not the time interval TI counted in step S419 is greater than a predetermined time interval $T_{TH}$. As the result of the judgement in step S420, when the time interval TI is greater than the predetermined time interval $T_{TH}$, the controller 204 searches for and monitors a paging channel of the N-th neighbor base station so that the mobile station 20 performs an idle handoff(step S421). Thus, the mobile station 20 can communicate with other mobile stations(not shown) located in a service area of the N-th neighboring base station. When it is judged that the time interval TI is less than or equal to the predetermined time interval $T_{TH}$, the routine goes to step S416.

EMBODIMENT 3

Figure 5:
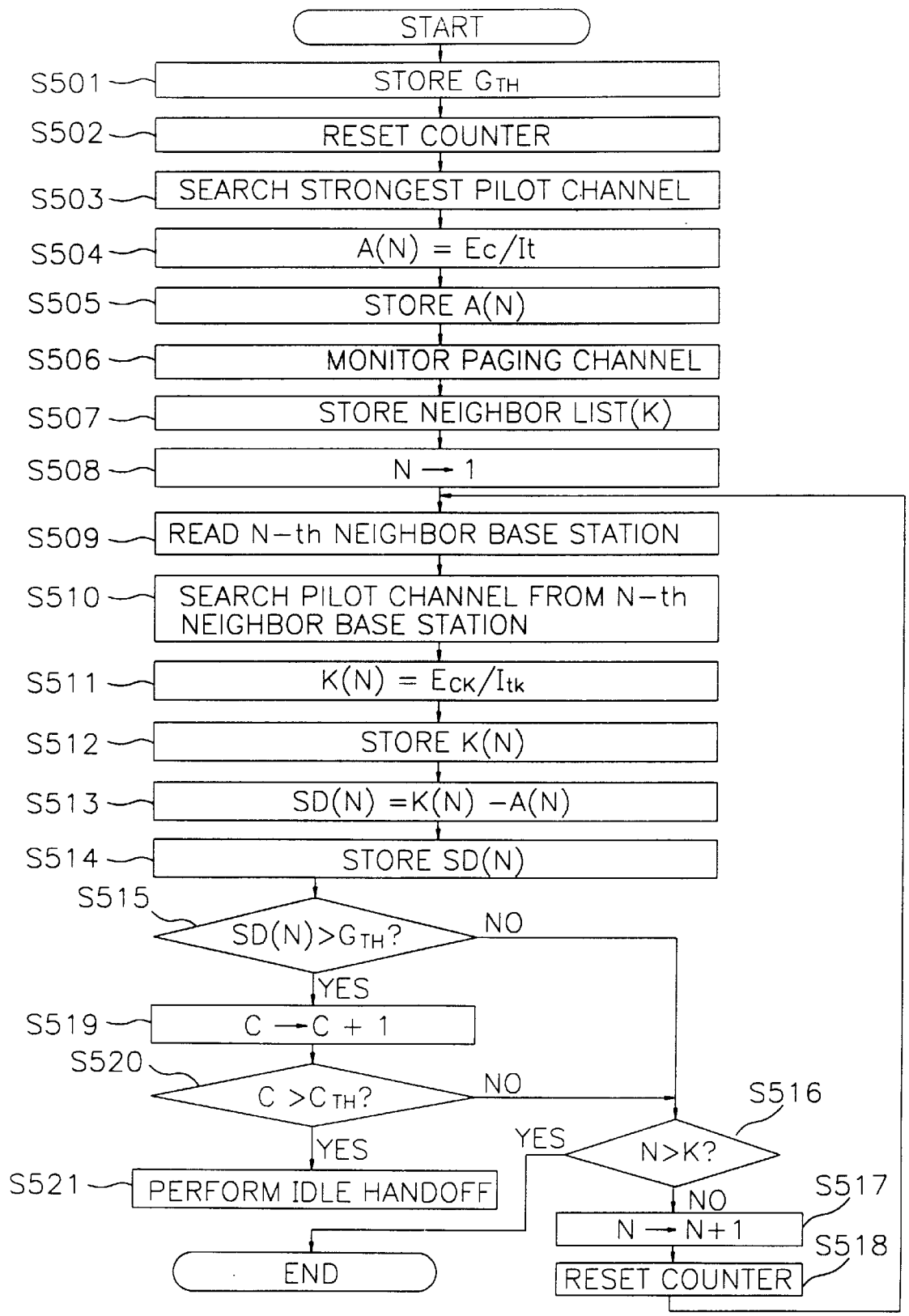
FIG. 5 is a flow chart for illustrating an idle handoff controlling method in a cellular communication system according to the third embodiment of the present invention.

FIG. 5 illustrates an idle handoff controlling method in a cellular communication system according to the second embodiment of the present invention.

In step S501, the controller 204 controls the memory 206 to store a threshold value $G_{TH}$ therein before performing the idle handoff. When a user presses a power button of a key input section 202, a controller 204 controls the timer 208 to be reset (step S502). In step S503, the controller 204 searches for a pilot channel having the strongest strength on a current CDMA frequency assignment transmitted from one of the plurality of base stations 101, 102, 103, . . . 10 (N−1), and 10N (where, N is an integer) as an active base station 101.

In step S504, the controller 204 measures a strength A(N) (where, N is an integer) of the first pilot channel searched in step S403, that is, the radios of received pilot energy per chip, Ec, to total received spectral density (noise and signals), It. Then the controller 204 stores the pilot channel strength A(N) with respect to the active base station 101 in the memory 206(step S505).

In step S506, the controller 204 monitors a paging channel having a neighbor list(K) (where K is an integer) of the active base station 101 which has a plurality of neighbor base stations transmitted from the active base station 101 in synchronization with the pilot channel searched in step S503. In step S507, the controller 204 controls the memory 206 to store a neighbor list(K) (where K is an integer) of the active base station 101 included on the paging channel therein. In step S508, the controller 204 sets the number of a neighbor base station message to be read to 1(N−1). In step S509, the controller 294 reads the message corresponding to an n-th neighbor base station stored in the memory 206.

In step S510, a controller 204 searches for a pilot channel transmitted from the n-th neighbor base station corresponding to the message read in step S409. In step S511, the controller 204 measures a strength K(N) (where N is an integer) of the pilot channel searched in step S510. Then the controller 204 stores the second pilot channel strength K(N) with respect to the N-th neighbor base station in the memory 206 (step S512).

In step S513, the controller 204 subtracts the strength A(N) of the pilot channel with respect to the active base station 101 from the second pilot channel strength K(N) with respect to the N-th neighbor base station which are stored in the memory 206 to obtain a strength difference SD(N). That is, SD(N)=K(N)−A(N). Then the controller 204 stores the strength difference SD(N) obtained in step S513 in the memory 206 (step S514).

In step S515, the controller 204 judges whether or not the strength difference SD(N) is greater than the threshold value $G_{TH}$ which is stored in the memory 206. As the result of the judgement in step S515, when the strength difference SD(N) is less than or equal to the threshold value $G_{TH}$, the controller 204 judge s whether or not the executing number N of step S515 is greater than the total number K of the neighbor base station(step S516).

As the result of the judgement in step S516, when the executing number N of step S515 is greater than the total number K of the neighbor base stations of the active base station 101, the routine is completed. When it is judged that the executing number N of step S515 is smaller than or equal to the total number K of the neighbor base stations, the controller 204 searches for a pilot channel presently transmitted from the active base station 101 and increases the number of a neighbor base station message to be processed (step S418). Then the controller 204 controls the counter 210 to be reset (step S518) and the routine returns to step S509 so that the above processes with r espect to a neighbor base station 2, a neighbor base station 3, . . . , a neighbor base station N−1, and a neighbor base station N are sequentially performed as shown in FIG. 6.

On the other hand, as the result of the judgement in step S15, when the strength difference SD(N) is greater than the threshold value $G_{TH}$, the controller 204 controls the counter 210 to count the performance number C of step S515(step S519). In step S520, the controller 204 judges whether or not the counting number C by the counting operation in step S519 is greater than a predetermined number $C_{TH}$.

As the result of the judgement in step S520, when the counting number C is greater than a predetermined number $C_{TH}$, the controller 204 searches for and monitors a paging channel of the N-th neighbor base station so that the mobile station 20 performs an idle handoff (step S521). Thus, the mobile station 20 can communicate with other mobile stations (not shown) located in a service area of the N-th neighboring base station. When it is judged that the counting number C is smaller than or equal to a predetermined number $C_{TH}$, the routine goes to step S516.

As mentioned above, according to the present invention, by reducing the number of the idle handoff in a cellular communication system, waste of a battery of the mobile station is reduced, calling of the mobile station is increased, and communication efficiency of a reverse control channel becomes higher.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An idle handoff controlling method in a cellular mobile communication system, said method comprising the steps of:
    a) searching a first pilot channel having the strongest strength transmitted from one of a plurality of base stations as an active base station and measuring a strength of the first pilot channel;
    b) calculating a variable threshold value based on the first pilot channel strength measured in step a);
    c) monitoring a paging channel having a neighbor list of the active base station having a plurality of neighbor base stations in synchronization with the first pilot channel;
    d) measuring a strength of a second pilot signal transmitted from one of the plurality of neighbor base stations included on the neighbor list;
    e) subtracting the first pilot channel strength from the second pilot channel strength to obtain a strength difference;
    f) judging whether the strength difference is greater than the variable threshold value; and
    g) controlling performance of an idle handoff according to the judgement result of step f).

2. The method as claimed in claim 1, wherein the variable threshold value is proportional to the first pilot signal strength measured in step a).

3. The method as claimed in claim 1, wherein the variable threshold value is increased by a predetermined integer times of the first pilot channel strength with respect to the active base when the first pilot channel strength is increased.

4. The method as claimed in claim 1, wherein no matter how small the first pilot channel strength is, the variable threshold value is greater than a predetermined value.

5. The method as claimed in claim 1, wherein when the first pilot channel strength has a disrete value, the variable threshold value discretely changes.

6. The method as claimed in claim 1, wherein when the strength difference is greater than the variable threshold value in step f), step g) include performing an idle handoff with respect to the mobile station.

7. The method as claimed in claim 1, wherein when the strength difference is less than or equal to the threshold value in step f), step g) includes
    g-1) judging whether an executing number of step f) is greater than the total number of the neighbor base stations;
    g-2) searching for the first pilot channel having the strongest strength presently transmitted from the active base station when the executing number of step f) is smaller than or equal to the total number of the neighbor base stations and increasing the number of a neighbor base station message to be processed; and
    g-3) executing step d).

8. An idle handoff controlling method in a cellular communication system, said method comprising the steps of:
    i) searching a first pilot channel having the strongest strength transmitted from one of the plurality of base stations as an active base station and measuring a strength of the first pilot channel;
    ii) monitoring a paging channel having a neighbor list of the active base station which has a plurality of neighbor base stations in synchronization with the first pilot channel;
    iii) measuring a strength of a second pilot signal transmitted from one of the plurality of neighbor base stations in the neighbor list neighboring the active base station;
    iv) subtracting the first pilot channel strength from the second pilot channel strength to obtain a strength difference;
    v) judging whether the strength difference is greater than a threshold value;
    vi) judging whether a state that the strength difference is greater than the threshold value lasts for a predetermined time interval when the strength difference is greater than the threshold; and
    vii) controlling performance of an idle handoff according to a judgement result of step vi).

9. The method as claimed in claim 8, wherein when the strength difference is greater than the threshold value in step v), the method further comprising
    viii) judging whether an executing number of step v) is greater than the total number of the neighbor base stations;
    ix) searching for the first pilot channel having the strongest strength presently transmitted from the active base station when the executing number of step v) is smaller than or equal to the total number of the neighbor base stations and increasing the number of a neighbor base station message to be processed; and
    x) executing step iii).

10. The method as claimed in claim 8, wherein when the state that the strength difference is greater than the threshold value lasts for the predetermined time interval in step vi), step vii) includes performing an idle handoff with respect to the mobile station.

11. The method as claimed in claim 8, wherein when the state that the strength difference is greater than the threshold value lasts for a time interval shorter than the predetermined time interval in step vi), step vi) includes
    vi-1) judging whether an executing number of step v) is greater than the total number of the neighbor base stations;

vi-2) searching for the first pilot channel having the strongest strength presently transmitted from the active base station when the executing number of step v) is smaller than or equal to the total number of the neighbor base stations and increasing the number of a neighbor base station message to be processed; and vi-3) executing step iii).

12. The method as claimed in claim 8, wherein step vi) includes vi-1) counting a time interval in which the strength difference greater than the threshold value lasts; and vi-2) judging whether the Lime interval counted in vi-1) is greater than a predetermined time interval.

13. An idle handoff controlling method, said method comprising the steps of:

(A) searching a first pilot channel having the strongest strength transmitted from one of a plurality of base stations as an active base station and measuring a strength of the first pilot channel;

(B) monitoring a paging channel having a neighbor list of the active base station which has a plurality of neighbor base stations in synchronization with the first pilot channel and storing the neighbor list;

(C) measuring a strength of a second pilot signal transmitted from one of the plurality of neighbor base stations in the neighbor list neighboring the active base station;

(D) subtracting the strength of the first pilot signal from the strength of the second pilot signal to obtain a strength difference;

(E) judging whether the strength difference is greater than a threshold value;

(F) judging whether step (E) is performed by a predetermined number; and (G) controlling performance of an idle handoff according to a judgement result of step F).

14. The method as claimed in claim 13, wherein when the state that the strength difference is greater than the threshold value lasts for the predetermined time interval in step (E), step (F) includes performing an idle handoff with respect to the mobile station.

15. The method as claimed in claim 13, wherein step (F) includes (F-1) counting performance number of step (E); and (F-2) judging whether a counting number by the counting operation of (F-1) is larger than the predetermined number.

* * * * *

(12) EX PARTE REEXAMINATION CERTIFICATE (9792nd)
United States Patent
Kim et al.

(10) Number: US 6,195,551 C1
(45) Certificate Issued: Aug. 12, 2013

(54) IDLE HANDOFF CONTROLLING METHOD IN CELLULAR COMMUNICATION SYSTEM

(75) Inventors: Kyu-Nam Kim, Seoul (KR); Dong-Woo Kim, Kyunggi-Do (KR)

(73) Assignee: SK Telecom Co., Ltd., Seorin-Dong, Jongro-Gu, Seoul (KR)

Reexamination Request:
No. 90/012,360, Jun. 15, 2012

Reexamination Certificate for:
Patent No.: 6,195,551
Issued: Feb. 27, 2001
Appl. No.: 09/119,632
Filed: Jul. 21, 1998

(30) Foreign Application Priority Data

Jul. 22, 1997 (KR) .................................. 97-34117

(51) Int. Cl.
*H04W 36/00* (2009.01)

(52) U.S. Cl.
USPC ........... 455/436; 455/437; 455/440; 455/442; 370/331; 370/332

(58) Field of Classification Search
None
See application file for complete search history.

(56) References Cited

To view the complete listing of prior art documents cited during the proceeding for Reexamination Control Number 90/012,360, please refer to the USPTO's public Patent Application Information Retrieval (PAIR) system under the Display References tab.

*Primary Examiner* — Nick Corsaro

(57) ABSTRACT

An idle handoff controlling method effectively reduces the number of idle handoff processes in a cellular communication system. In the method, a first pilot channel having the strongest strength transmitted from one of a plurality of base stations as an active base station is searched and a strength of the first pilot channel is measured. A variable threshold value based on the first pilot channel strength is calculated. A paging channel having a neighbor list having a plurality of neighbor base stations is monitored in synchronization with the first pilot channel. A strength of a second pilot signal transmitted from one of the plurality of neighbor base stations is measured. The first pilot channel strength from the second pilot channel strength is subtracted to obtain a strength difference. It is judged whether the strength difference is greater than the variable threshold value. Performance of an idle handoff according to the judgement result is controlled. In the method, by reducing the number of the idle handoff in a cellular communication system, waste of a battery of the mobile station is reduced, arrival rate of the mobile station is increased, and communication efficiency of a reverse control channel becomes higher.

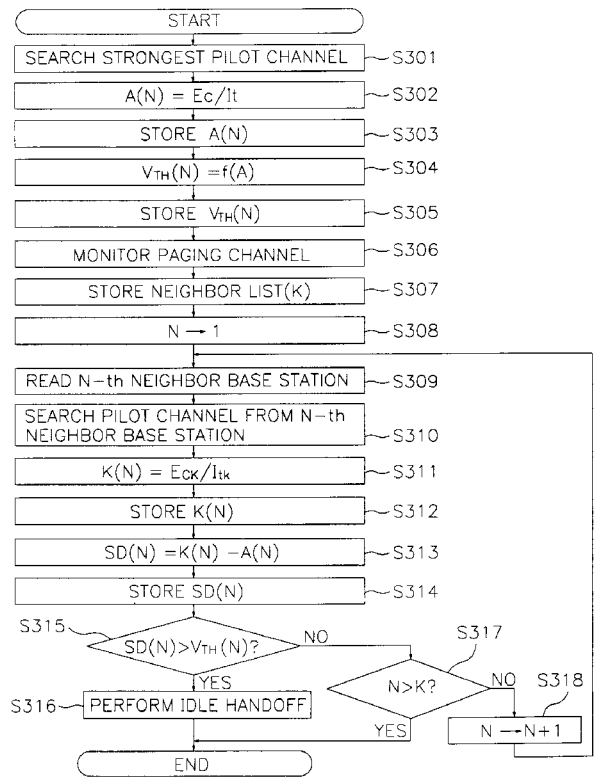

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-15 is confirmed.

\* \* \* \* \*